United States Patent [19]
Yamada

[11] Patent Number: 5,479,003
[45] Date of Patent: Dec. 26, 1995

[54] AUTOMATIC CARD ISSUANCE APPARATUS AND AUTOMATIC CARD ISSUANCE METHOD

[75] Inventor: Naoki Yamada, Tokyo, Japan

[73] Assignee: Olympus Optical Co., Ltd., Tokyo, Japan

[21] Appl. No.: 51,685

[22] Filed: Apr. 23, 1993

[30] Foreign Application Priority Data

Apr. 27, 1992 [JP] Japan ..................... 4-107982

[51] Int. Cl.$^6$ ................................ G06K 13/00
[52] U.S. Cl. .................... 235/475; 235/375; 235/380
[58] Field of Search ....................... 235/454, 475, 235/493, 379, 380, 437, 375

[56] References Cited

U.S. PATENT DOCUMENTS

| | | | |
|---|---|---|---|
| 4,016,405 | 4/1977 | McCune | 235/380 |
| 4,772,782 | 9/1988 | Nonat | 235/380 |
| 4,825,054 | 4/1989 | Rust | 235/380 |
| 4,827,425 | 5/1989 | Linden | 364/478 |
| 4,877,946 | 10/1989 | Ando | 235/380 |
| 4,968,873 | 11/1990 | Dethloff | 235/380 |

FOREIGN PATENT DOCUMENTS

| | | |
|---|---|---|
| 62-14260 | 1/1987 | Japan . |
| 64-17720 | 1/1989 | Japan . |
| 64-91294 | 4/1989 | Japan . |
| 2-171886 | 7/1990 | Japan . |

Primary Examiner—John Shepperd
Assistant Examiner—Karl D. Frech
Attorney, Agent, or Firm—Armstrong, Westerman, Hattori, McLeland & Naughton

[57] ABSTRACT

An automatic card issuance apparatus and an issuance method automatically retrieve information to be recorded onto an information recording and playback section of a card on the basis of information read from an information playback section of the card, from a data storage section, to record information retrieved and taken out onto the information recording and playback section, whereby recording of the information corresponding to information on the information playback section is made reliable, and the card is automatically issued efficiently.

6 Claims, 5 Drawing Sheets

AUTOMATIC CARD ISSUANCE APPARATUS AND AUTOMATIC CARD ISSUANCE METHOD

BACKGROUND OF THE INVENTION

1. Field of the Invention

The present invention relates to an automatic card issuance apparatus and an automatic card issuance method in which the apparatus and the method have an information recording and playback (reproducing) section, and in which cards to be distinguishable from other cards such as cards on which personal or individual data and design of a specific organization or the like are recorded, printed or the like are issued or published.

2. Related Art And Prior Art Statement

Since a recording capacity of an information recording and playback section of an optical card, an IC card or the like is large, individual data of a card owner, data peculiar to an issuance organization (the seat of the organization, the name of the organization, and the like) and the like can be easily recorded onto the information recording and playback section and are utilized as an identification card, a membership card or a health care card.

In a case where the aforesaid card is utilized for the above-described purpose, cases increase where it is required that the card owner is judged at a glance and the publishing or issuance origin is confirmed without reading out data at the information recording and playback section of the card by an information recording and playback apparatus. For this reason, it has been performed that the individual data (the name, the date of birth, the address, the photograph of face and the like) of the card owner are printed on a space other than the information recording and playback section on a rear surface or the like of the card, and design peculiar to the issuance organization is applied to the card.

In order to issue the card to the card owner, it is required that the individual data of the owner are printed on the aforementioned card and, in addition thereto, the individual data of the owner (the name, the date of birth, the address, the history of a case, the results of a medical examination and the like, although as being different depending upon an object of card issuance) are recorded also on the information recording and playback section of the issued card.

Conventionally, the card issuance is arranged such that individual data of a card owner are printed on a card, and design is further applied to the card. Subsequently, the name of the card owner, for example, is inputted to a card issuance device by the use of inputting means such as a keyboard, while the printed data and design are confirmed by a human being. By the procedure that by inputting of the name and the like, data to be recorded on the information recording and playback section of the card are taken out or fetched from a data base or the like and are recorded by the information recording device, the cards are published or issued.

Furthermore, an apparatus is disclosed in Japanese Patent Laid-Open No. 14260/1987 in which bar codes are provided on a portable recording medium such as magnetic cards, IC cards, laser cards, and a classification of these cards is discriminated on the basis of the information.

However, in Japanese Patent Laid-Open No. 14260/1987, only the kinds of the portable recording medium such as magnetic cards, IC cards, laser cards are discriminated.

Moreover, as described previously, the cards are issued by the procedure that the data are recorded onto the information recording and playback section of the card by the information recording apparatus, while the data and the design printed on the card are confirmed by a human being. At this time, by an error in reading of the data and mistake of inputting by a human being, there is a case where data printed on the card or data different from the design are recorded onto the information recording and playback section. Furthermore, the number of issuable cards are limited, and thus, numerous cards cannot be issued. Further, there is a disadvantage that an issuance cost per one card increases.

OBJECTS AND SUMMARY OF THE INVENTION

It is an object of the invention to provide an automatic card issuance apparatus and an automatic card issuance method which have no reading error of data and inputting mistake thereof due to a human being, and in which it is possible to issue a card on which corresponding data are reliably recorded onto data recorded onto the card by printing or the like.

It is another object of the invention to provide an automatic card issuance apparatus and an automatic card issuance method in which data corresponding to the data recorded by printing onto a card are easily recorded, and the cards can be effectively issued.

An automatic card issuance apparatus of the invention comprises means for reading information recorded onto an information playback section of a card having the information playback section and an information recording and playback section, means for writing information onto the information recording and playback section of the card, and control means for automatically retrieving information to be recorded onto the information recording and playback section from data storing means provided on the outside or the inside of the apparatus on the basis of the information recorded onto the information playback section and read by the reading means and for controlling the information retrieved by the retrieving means so as to be recorded onto the information recording and playback section of the card by the writing means.

Further, the automatic card issuance method according to the invention comprises:

the step of reading information recorded onto an information playback section of a card having the information playback section and an information recording and playback section, the step of automatically retrieving information to be recorded onto the information recording and playback section out of data storing means on the basis of information read from the information playback section by the reading step, and the step of writing information retrieved and taken out of the data storing means by the step of retrieving onto the information recording and playback section of the card.

Other objects and advantages of the present invention will become sufficiently apparent from the following detailed description.

DETAILED DESCRIPTION OF THE PREFERRED EMBODIMENTS

Figure 1:
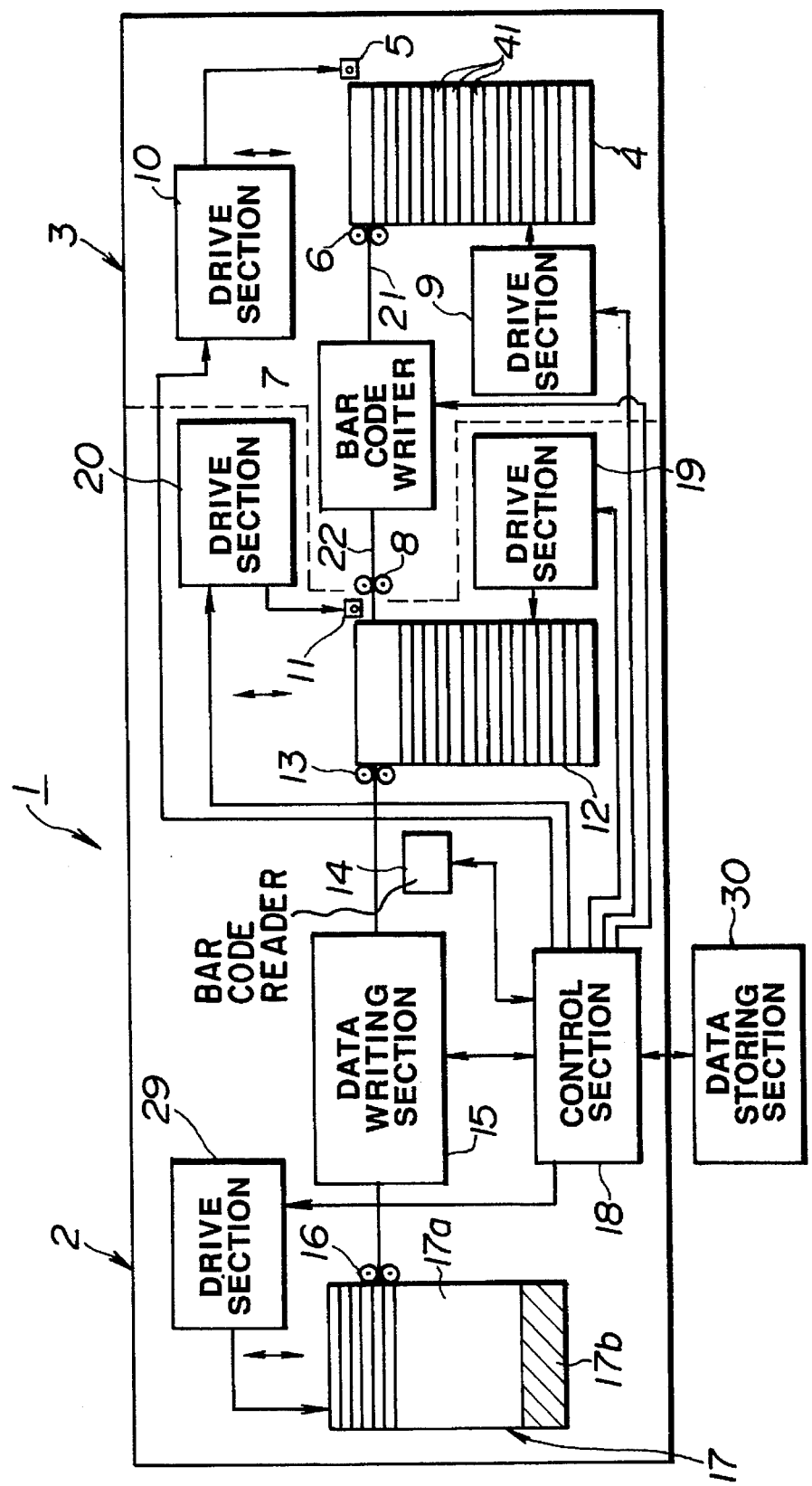
FIG. 1 is a schematic arrangement view of an automatic card issuance apparatus according to a first embodiment of the invention.
Figure 2:
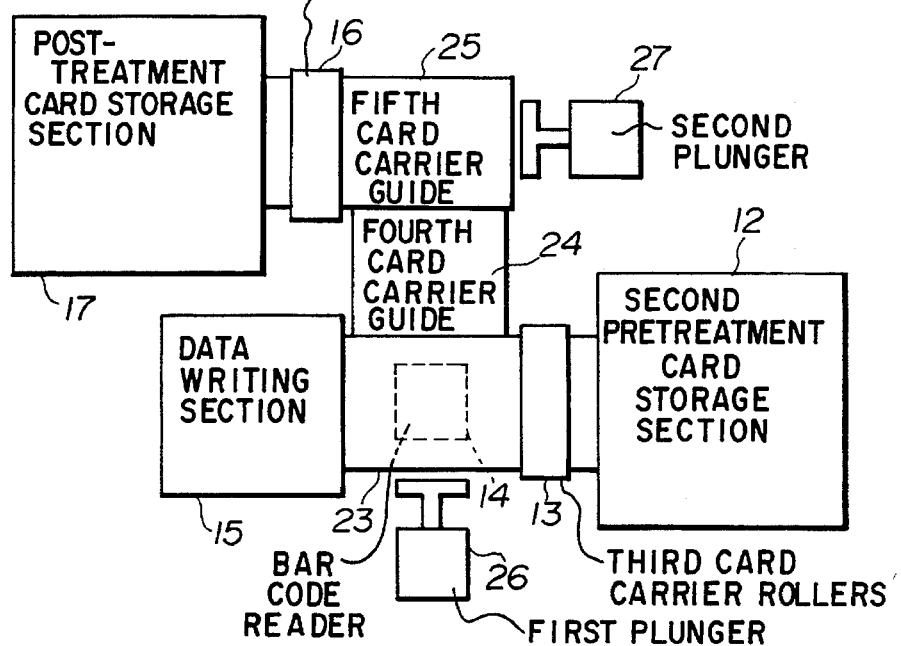
FIG. 2 is an arrangement view showing an example of a carrier mechanism of the apparatus illustrated in FIG. 1.
Figure 3:
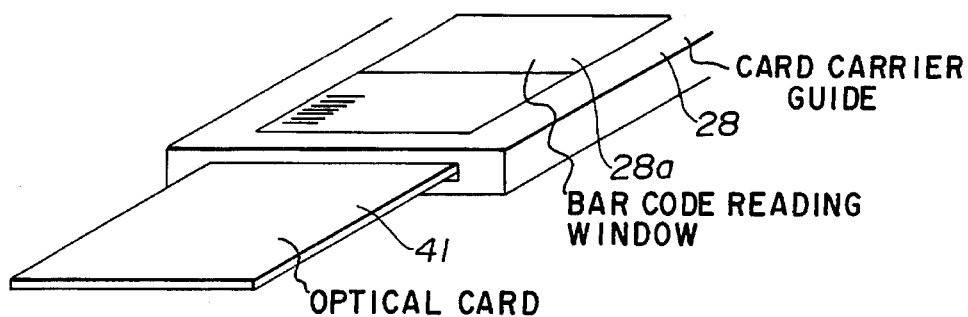
FIG. 3 is a view for explanatory of reading by a bar code reader.
Figure 4A:
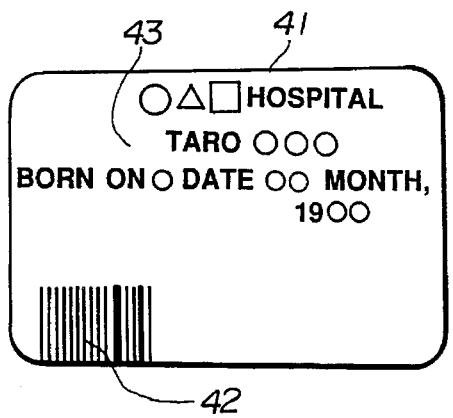
FIGS. 4(a) and 4(b) are schematic arrangement views of a rear surface and a front surface of an optical card.
Figure 4B:
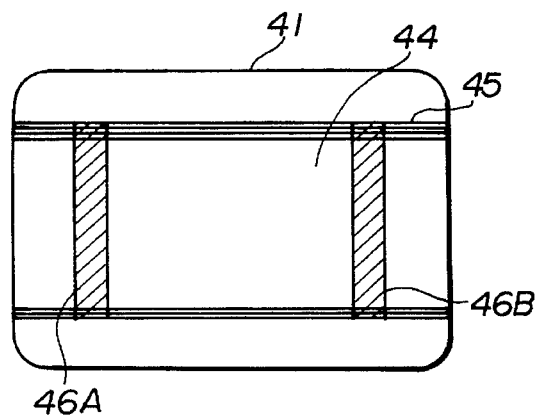
Figure 5:
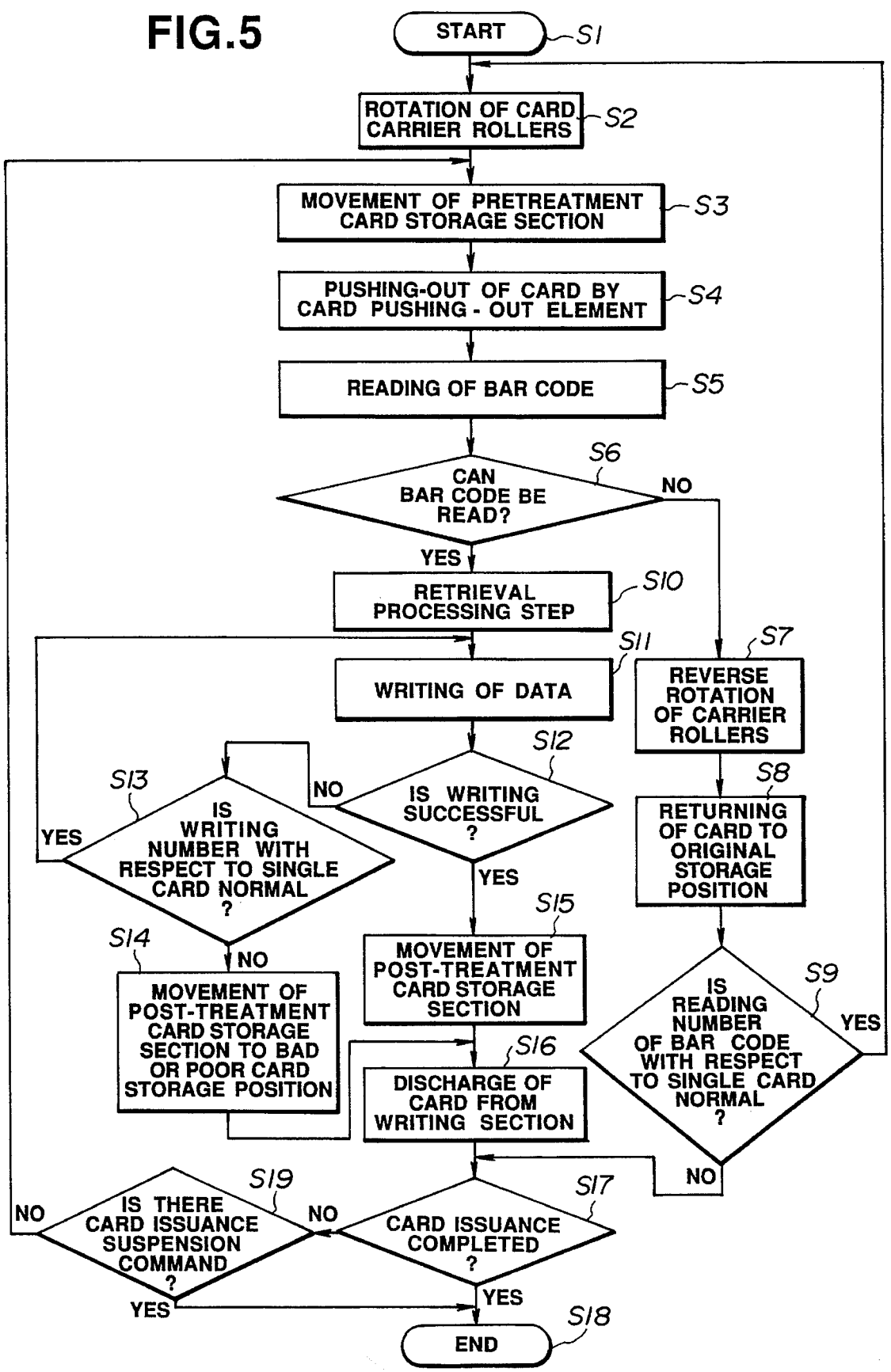
FIG. 5 is a flow chart regarding writing of information.
Figure 6:
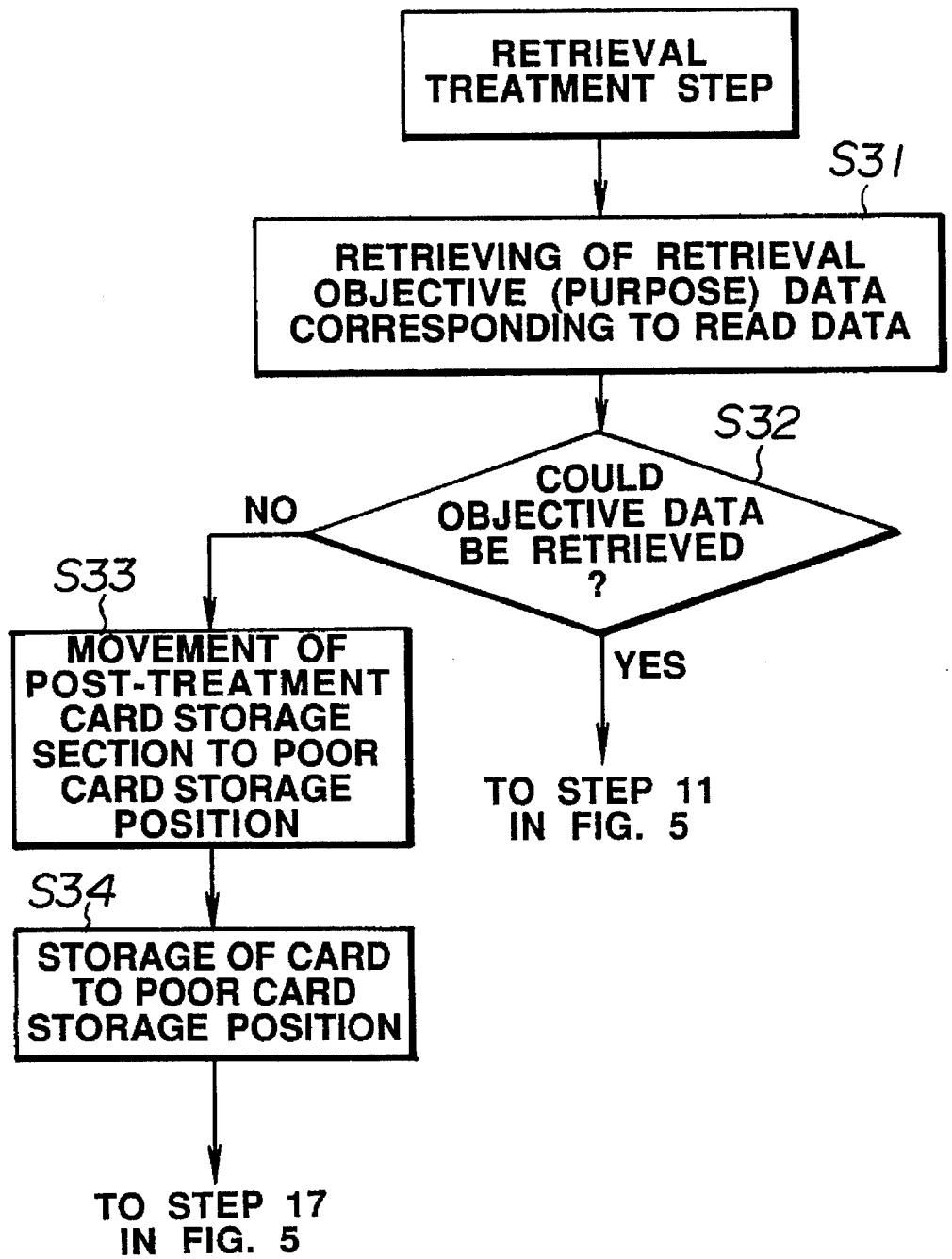
FIG. 6 is a flow chart regarding retrieval treatment.

FIGS. 1 to 6 relate to a first embodiment of the invention. FIG. 1 is a schematic arrangement view showing an automatic card issuance apparatus. FIG. 2 is an arrangement view showing an example of a carrier mechanism of the apparatus illustrated in FIG. 1. FIG. 3 is a view for explanation of reading by a bar code reader. FIGS. 4(a) and 4(b) are schematic arrangement views of a rear surface and a front surface of an optical card. FIG. 5 is a flow chart regarding writing of information. FIG. 6 is a block diagram showing another example regarding main or chief control of the apparatus.

FIG. 4(a) shows a rear surface of an optical card 41 on which individual data and bar codes are printed. The optical card 41 has the rear surface on which individual data (the name, the address and the date of birth, for example) of the card owner, and data of the name of issuance organization of the card and the like are printed on a data printing section 43, and a bar code 42 serving as an information playback section corresponding to the printed data is printed on the left lower portion of the data printing section 43. Further, the optical card 41 has a front surface onto which, as shown in FIG. 4(b), information is optically written. The optical card 41 has an information recording and playback section 44 from which the recording information is read out. The optical card 41 has a plurality of tracks 45 extending in parallel relation to each other and in the direction of long side. The information recording and playback section 44 is formed substantially at a center of the plurality of tracks 45. The information recording and playback section 44 has neighborhoods of both ends thereof adjacent respectively to the card short sides, adjacent to which ID sections 46A and 46B are located on which information such as addresses and the like corresponding respectively to the tracks are recorded so as to be readable from directions opposite to each other. Information recorded on the respective ID sections 46A and 46B is the same as each other.

In a data writing section to be described subsequently, when, for example, the optical card 41 is moved with respect to an optical head (not shown) in the track direction from the left to the right in the figure, the ID section 46A is read, and address information corresponding to the track can be recognized. Further, when the optical card 41 is moved from the right to the left in the figure with respect to the optical head in the track direction, the ID section 46B is read so that track information corresponding to the track can be recognized. In this connection, the ID sections 46A and 46B are provided on the inside from the ends of the optical card 41 predetermined distances (approximately 4 mm, for example) in order to prevent wound, dirt and the like of the card end from being influenced upon and in order to sufficiently stabilize relative speed between the optical card 41 and the optical head in the track direction. Moreover, the ID sections 46A and 46B are beforehand pre-formatted upon manufacture of the optical card.

The card to be issued is not particularly limited to the optical card, but may be an IC card, a magnetic card or the like. Further, the data printing section 43 may also be a space other than the information recording and playback section 44 at the card, and is not required to be the rear surface of the card. The type of the card discriminating information corresponding to the printing data is not limited to the bar code, but may be an optical letter, embossing, or a magnetic stripe. Furthermore, the printing position of the information playback section of the card discrimination such as the bar code and the like is not also required to be the left lower position as is in the illustrated example.

The automatic card issuance apparatus 1 illustrated in FIG. 1 is provided with a discrimination and data recording section 2 illustrated on the left side of a broken line in the figure, and a printing section 3 illustrated on a right side of the broken line in the figure. The printing section 3 is provided for printing the bar code 42, individual data and the like onto predetermined positions on the optical card 41. Further, the discrimination and data recording section 2 discriminates the optical card 41 completed in printing processing at the printing section 3, and reads out the data corresponding to the bar code 42 from a data storing section to be described subsequently, to optically record information onto the card.

The printing section 3 is provided with a first pretreatment card storage section 4 for receiving an untreated optical card on which printing is not executed, a first card pushing-out element 5 for pushing out the card received in the storage section 4, a pair of first card carrier rollers 6 for carrying the pushed-out card, and a bar-code writer 7 for subjecting printing treatment onto the card carried by the pair of rollers 6.

The bar code writer 7 executes printing with respect to the data printing section 43 such as individual data or the like, and executes also printing of the bar code 42. As this bar-code writer, for example, a bar-code printing apparatus available commercially may be used. The bar-code printing apparatus has a RAM (random access memory) having stored therein a table. On the table, correspondence to the name of a card owner and correspondence of the file number of the data, for example, optically written to the card are beforehand written. Thus, when the name of the card owner is inputted, data of the file number of the written data read out from the RAM are printed as a bar code together with the inputting.

In connection with the above, the data optically written onto the card, that is, the data meant by the bar code may be addresses on which the data are stored, the register number of the card user, or the like in place of the file number. In summary, the data may be information which serves as a key for taking out objective data from a data storing section 30 to be described subsequently.

Further, the printing section 3 is provided with a pair of second card carrier rollers 8 for carrying the card discharged from the bar code writer 7 to the discrimination and data recording section 2, a drive section 9 for moving the pretreatment card storage section 4 upwardly and downwardly like arrows in the drawing, and a drive section 10 for driving the first card pushing-out element 5.

Moreover, the printing section 3 has a first card carrier guide 21 interposed between the first pretreatment card storage section 4 and the bar code writer 7, and a second card carrier guide 22 interposed between the bar code writer 7 and a second pretreatment card storage section 12 to be described subsequently. The optical card 41 is adapted to be carried on these card carrier guides by each of the pair of rollers.

The discrimination and data recording section 2 is provided with a second card pushing-out element 11, the second pretreatment card storage section 12, third card carrier rollers 13, a bar code reader 14 serving as reading means, a data writing section 15 serving as writing means, fourth card carrier rollers 16, a post-treatment card storage section 17, and a control section 18 serving as control means.

Furthermore, the discrimination and data recording section 2 is provided with a drive section 19 for moving the second pretreatment card storage section 12 upwardly and downwardly like the arrows in the drawing, a drive section 20 for driving the second card pushing-out element, and a drive section 29 for moving the post-treatment card storage section 17 upwardly and downwardly like the arrow in the drawing. A control section 18 controls the bar code writer 7, the drive sections 9, 10, 19, 20 and 29, the bar code reader 14, and the data writing section 15.

The first and second pretreatment card storage sections 4 and 12, and the post-treatment card storage section 17 are movable in the direction indicated by the arrow in the figure by a pulse motor (not shown) arranged respectively within the drive sections. The purpose thereof is to align the optical card 41 carried respectively to the bar code writer 7 and the data writing section 15 with positions capable of being pushed out by the first and second card pushing-out elements 5 and 11, while correctly storing the optical card 41 after treatment within the post-treatment card storage section 17. Accordingly, the first and second card pushing-out elements 5 and 11 may be any type, if it is a mechanism in which the cards to be treated are sent to the card carrier guide, such as a mechanism in which the optical cards 41 stored respectively in the first and second pretreatment card storage sections 4 and 12 are pushed out one by one by, for example, spring pressure.

The bar code reader 14 is one which reads data of the bar code 42 which is printed by the bar code writer 7. The read data are sent to the control section 18. In this connection, if the type of the card discrimination information is not the bar code, but is naturally optical letters, embossing or magnetic stripe, the bar code reader 14 is an OCR, emboss reader or a magnetic reader.

The data writing section 15 is an optical-card recording and playback device which executes recording/playback of information optically or photo-electromagnetically with respect to the optical card 41.

Moreover, the control section 18 is connected to the data storing section 30 consisting of, for example, an information recording device such as an optical disc device, a photo-electro-magnetic disc device or the like arranged on the outside of the apparatus 1 so that the control section 18 can take out optional data stored in the data storing section 30.

Figure 7:
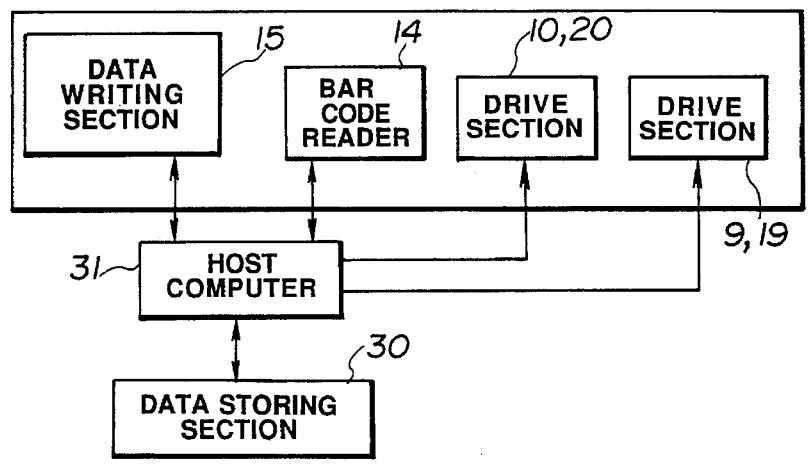
FIG. 7 is a block diagram showing another example regarding main control of an apparatus.

Data recorded onto all of the optical cards 41 to be issued are stored in the data storing section 30. In this connection, as shown in FIG. 7, if all control of the automatic optical-card issuing apparatus 1 is executed or performed by a host computer 31 which is arranged on the outside, the control section 18 is not particularly required.

Subsequently, a specific example of a card carrier mechanism of the discrimination and data recording section 2 will be described.

In the carrier mechanism illustrated in FIG. 2, a third card carrier guide 23 is interposed between the second pretreatment card storage section 12 and the data writing section 15. Further, a fourth card carrier guide 24 is arranged on one side of the third card carrier guide 23. A fifth card carrier guide 25 is arranged adjacent to one of ends of the fourth card carrier guide 24 which is opposed against the guide 23. A first plunger 26 for pushing out the card 41 on the third card carrier guide 23 to the fifth card carrier guide 25 is arranged on the other side of the third card carrier guide 23. The card 41 carried by the fifth card carrier guide 25 is pushed out to the fourth card carrier roller 16 by a second plunger 27.

Generally, the optical-card recording and playback apparatus is one in which an inserting port and an exhaust port for the card are integrated with each other. The carrier mechanism illustrated in FIG. 2 is an example which corresponds to the data writing section 15. In the carrier mechanism, the optical card 41 is carried into the data writing section 15 by the rollers 13, is again exhausted onto the third card carrier guide 23 by a feed mechanism within the data writing section 15 after writing of the data. Subsequently, after pushing-out operation of the plungers 26 and 27 has been executed, the card 41 is received into the post-treatment card storage section 17 through the fourth card carrier rollers 16.

In connection with the above, the post-treatment card storage section 17 is provided with a poor-card receipt area 17b, separately from an issuance-completed-card receipt area 17a which receives the cards on which the information is normally recorded.

Moreover, in an example of the carrier mechanism corresponding to an optical card recording and playback apparatus in which the inserting port and the exhaust port for the card are separately arranged, the arrangement may be such that the optical card recording and playback apparatus is one in which flow of the cards is carried in one direction, as shown in FIG. 1.

A card carrier guide 28 is provided with a bar code reading window 28a in a surface of a card carrier guide 28 on which the bar code reader 14 is arranged as shown in FIG. 3 in order to read the bar code printed on the rear surface of the optical card 41 upon carrying. The card carrier guide 28 may be provided between the second pretreatment card storage section 12 and the data writing section 15.

Operation of the printing section 3 will next be described.

A plurality of optical cards 41 on which individual data or the like stored in the first pretreatment card storage section 4 are not printed are successively pushed out to the pair of rollers 6 by cooperation of the first card pushing-out element 5 and the drive section 9. In the optical cards 41 pushed-out, individual data, data such as names of issuance organizations and the design are printed on predetermined positions.

At printing, the control section 18 outputs to the RAM data corresponding, for example, to card owner's names assigned successively in accordance with the stored data of the data storing section 30. The bar code writer 7 converts the inputted data at the table of the RAM, to print individual data of the bar code 42, the name of the card owner and the like. Furthermore, it is not required to input the data on the name of issuance organization, the design and the like, which are common to the cards, particularly from the control section 18, but the data on the name of issuance organization, the design and the like should be printed as common items in common with all of the cards. Alternatively, the common items may be manufactured together in a card manufacturing step.

The bar code writer 7 exhausts the cards which are completed in printing. The cards are received at a predetermined position on the card storage section 12 by upward and downward movement of the second pretreatment card storage section 12 and rotation of the pair of second card carrier rollers 8.

At the time printing has been completed on all of the cards, or under a condition in which printing is continued, discrimination of the cards and automatic issuance regarding writing of the data start or are initiated. In this connection, in a case where printing, discrimination of the cards and writing of the data are continuously executed, it is possible to dispense with the pretreatment card storage section 12 on the assumption that each treatment is executed smoothly.

Control of the discrimination and data recording section 2 will next be described with reference to a flow chart in FIG. 5.

In a step S1, card issuance regarding discrimination and writing of data starts. Then, in a step S2, the card carrier rollers 13 are rotated in the direction along which the optical card 41 is carried, toward the data writing section 15 from the second pretreatment card storage section 12. In a step S3, the second pretreatment card storage section 12 is moved in the direction indicated by the arrow, and is aligned with the optical card 41 which is stored in a predetermined position to be pushed out by the card pushing-out element 11. Subsequently, in a step S4, the predetermined optical card 41 to be issued is pushed out by the card pushing-out element 11, and the optical card 41 is carried to the data writing section 15. At process thereof, in a step S5, the bar code 42 printed on the rear surface of the card is read by the bar code reader 14.

Upon carrying, the bar code reader 14 reads the bar code 42 printed on the rear surface of the optical card 41, through the bar code reading window 28a in the card carrier guide 28 illustrated, for example, in FIG. 3. Accordingly, speed at which the optical card 41 is carried is so set as be aligned with reading speed of the bar code reader 14. Alternatively, card carrying may once stop at a position where the position of the bar code 42 printed on the card and the position of the bar code reader 14 are opposed against each other.

In a step S6, the control section 18 judges whether or not the bar code 42 is read at process of the optical card carrying. In a case where the bar code is not read, the carrier rollers 13 are reversely rotated in a step S7, and the card is returned to the original storage position in a step S8.

Reading of the bar code is frequently tried with respect to the returned card. In a step S9, it is judged whether or not the reading is equal to or more than a prescribed number of reading. If the card is judged as being a card which is not readable by a prescribed number, it is judged as being printing mistake of the bar code. The optical card 41 is not issued. Issuance preparation of a subsequent optical card 41 starts. In this connection, the card may be received into the poor card receipt area 17b of the post-treatment card storage section 17, or may be received in the pretreatment card storage section 12 as it is.

Furthermore, in the step S9, with respect to the optical card 41 less in number of reading of the bar code (equal to or less than a prescribed number), the same card is once more carried to the data writing section 15, and reading is again tried.

On the other hand, in a case where the bar code 42 can be read in the step S6, the program proceeds to an execution step for automatic retrieval in a step S10.

FIG. 6 shows an example of an execution step for automatic retrieval.

First, in a step S31, the control section 18 starts retrieval of stored data corresponding to the data of the bar code 42 read in the step S5 in FIG. 5, that is, retrieval of objective data which serve as the subject of retrieval. Subsequently, in a step S32, at the control section 18, in a case where all of the objective data cannot be retrieved from all the data which serve as retrieval subject data stored in the data storing section 30, the objective card is recognized as being a poor card. In view of this, in a step S33, the post-treatment card storage section 17 is moved for preparation of card receipt, and the poor-card receipt area 17b is aligned with the fourth card carrier rollers 16. In a step S34, the objective card is received in the poor card receipt area 17b of the post-treatment card storage section 17. Treatment proceeds to a step S17 illustrated in FIG. 5.

In connection with the above, it is considered that a cause of the poor card is the fact that although reading is possible, data of the bar code except for retrieval subject are printed, and the like. Moreover, the arrangement may be such that retrieval object data are arranged by a plurality of data groups, a series of card issuance treatments is executed with respect to a group of data, and another group of data is used to execute another series of card issuance treatments.

On the other hand, in the step S32, in a case where retrieval is made possible from the retrieval objective data stored in the data storing section 30, treatment proceeds to a step S11 illustrated in FIG. 5.

In the step S11 illustrated in FIG. 5, since the objective optical card 41 is a card capable of reading the bar code 42 and capable of retrieving, the data writing section 15 writes optically the data onto the information recording and playback section 44. When the data are recorded onto the optical card 41 carried to the data writing section 15, data to be recorded are fetched from data which are stored within the data storing section 30 managed by the control section 18 (or the host computer 31 illustrated in FIG.

As described previously, retrieval of the objective data is executed on the basis of the data of the bar code 42 which are printed on the optical card and which are read by the bar code reader 14. The data that the bar code 42 has may be a key (key information) for taking out objective data from the data storing section 30 such as file number of data written onto the information recording and playback section 44 of the optical card 41, or addresses in which data are stored, register numbers of card users.

In a step S12, if data written onto the information recording and playback section 44 of the card are abnormal verified is at the data writing section 15, the following processing is executed. That is, in a step S13, occurrence frequency of the poor cards is reduced so as to execute data writing onto different tracks or sectors. If the number of rewriting exceeds a prescribed number, the poor cards are received in the poor card receipt area 17b of the post-treatment card storage section 17 in a step S14. In this connection, in a case where it is verified that the data are abnormal, the verification may be tried through the prescribed number.

Furthermore, if the writing data are normal in the step S12, preparation is made to receive the cards to predetermined position of the post-treatment card storage section 17 in a step S15. That is, the post-treatment card storage section 17 is moved in an arrowed direction.

The optical cards are subsequently exhausted from the data writing section (optical-card recording and playback apparatus) 15 in a step S16. The exhausted optical cards are moved transversely by the plunger 26 in case of the carrier mechanism illustrated in FIG. 2, for example, and are moved onto the fifth carrier guides 25. The fourth carrier rollers 16 start to be rotated at this time. The optical card 41 is pushed out in the direction of the conveyor rollers 16 by the plunger 27 so that the optical card 41 is sent to the post-treatment card storage section 17 by the carrier rollers 16.

In this manner, the data taken out of the data storing section 30 are recorded onto the information recording and playback section 44 of the optical card 41. The card which succeeds writing of the data is stored in the issuance-completed-card receipt area 17a of the post-treatment card storing section 7. Moreover, cards which fail to write the data (or cards fail to be printed) are stored in the poor-card storage section 17 of the post-treatment card storage section 7. Such series of procedures are executed with respect to all the cards stored. In the step S17, if it is judged that the issuance has been completed, issuance of the card is completed in a step S18. If issuance has not been completed, automatic issuance treatment is repeated.

In connection with the above, if an issuance suspension command is outputted from the control section 18 in a step S19, issuance is completed.

In this manner, in the embodiment, when the individual data of the owner are printed onto the optical cards 41 and, further, design peculiar to issuance organization is applied to the optical cards 41, printing contents of the optical cards one by one, or bar codes corresponding to the design, or optical letters are added, and reading of the information is executed by the bar code reader 14 or an information detector such as an optical letter reading device. In the embodiment, data to be recorded onto the information recording and playback section 44 of the optical card 41 are retrieved from the data storing section 30 on the basis of the read information, and data taken out by the retrieving are recorded onto the information recording and playback section 44 of the optical card 41.

In conventional issuance of optical cards, a human being reads data printed onto the optical cards, to execute inputting operation into an apparatus on the basis of the data, and the apparatus retrieves data to be recorded onto the information recording and playback area of the optical card from the data storing section 30 in accordance with the inputting. To the contrary, according to the embodiment, data easy to be read such as bar codes printed onto the surface of the optical card are automatically read, and data to be recorded onto an information recording and playback area on the optical card are automatically retrieved from the data storage section so as to be recorded onto the card. Accordingly, the optical card absent in error of the data recorded onto the information recording and playback area of the optical card can efficiently be issued.

Furthermore, if the apparatus and the method according to the embodiment is used, consistent automatic issuance of cards can be executed from printing of the data printing section 43 of the card and the bar code 42 to recording of data onto the discrimination and information recording and playback section 44 of the optical card. Thus, it is possible to easily agree the printed data and the data to be recorded onto the information recording and playback section 44 with each other without errors, and it is possible to automatically issue the card efficiently, in large quantities and at a low cost.

In connection with the above, the arrangement of the pretreatment card storage sections 4 and 12 illustrated in FIG. 1 and the arrangement of the post-treatment card storage section 17 and the arrangement of the card pushing-out elements 5 and 11 can utilize a publicly known arrangement such as the use of a mechanism disclosed in, for example, Japanese Patent Laid-Open No. HEI 33187/1992.

Further, the storage mechanism for the cards and the carrier mechanism should not be limited to illustrated ones, but the arrangements disclosed, for example, in Japanese Patent Laid-Open No. SHO 14260/1989, Japanese Patent Laid-Open No. SHO 17720/1991, Japanese Patent Laid-Open No. SHO 91294/1989 and Japanese Patent Laid-Open No. HEI 171886/1990 may be applied to the storage mechanism for the cards and the carrier mechanism.

A second embodiment of the invention is directed to the arrangement of only the discrimination and data recording section 2 of the apparatus illustrated in FIG. 1, and is similar in arrangement and function to those of the first embodiment. Accordingly, the drawings and the description will be omitted. In the second embodiment, printing processing at the printing section 3 is executed by another apparatus or at another location.

The present embodiment is effective with respect to addition of writing data to the optical card 41 which has already been issued and optical cards which are not still issued, but which are subjected to the aforesaid printing processing. The printing processing can be executed in quantities and at a low cost, if the printing processing is executed at a printing office. Other arrangements and functional advantages are similar to those of the first embodiment, and the description thereof will be omitted.

Figure 8:
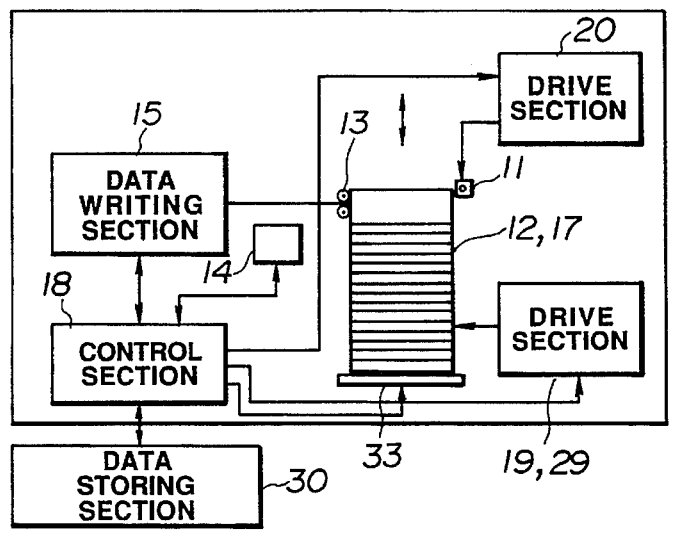
FIG. 8 is a schematic arrangement view of an automatic card issuance apparatus according to a third embodiment of the invention.
Figure 9:
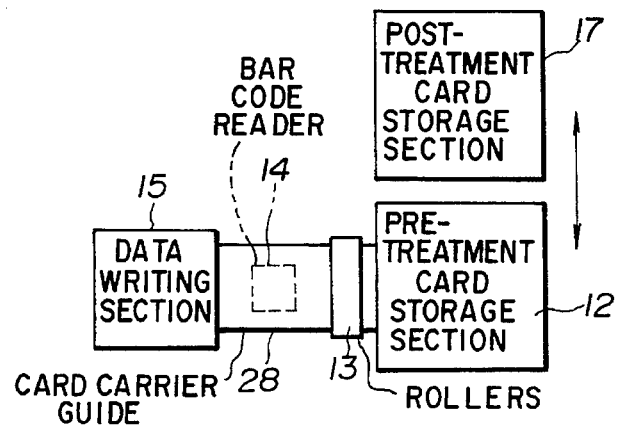
FIG. 9 is an arrangement view showing an example of a carrier mechanism of the apparatus illustrated in FIG. 8.

FIGS. 8 and 9 relate to a third embodiment of the invention. FIG. 8 is an electric schematic arrangement view of an automatic card issuance apparatus, while FIG. 9 is an arrangement view showing an example of a carrier mechanism of the apparatus illustrated in FIG. 8.

The present embodiment is arranged such that the printing section 3 and the rollers 16 are removed from the arrangement of the first embodiment illustrated in FIG. 1, and a post-treatment card storage section 17 is arranged in parallel relation to a pretreatment card storage section 12, as shown in FIG. 9. A card carrier guide 28 is interposed between a pretreatment card storage section 12 and a data writing section 15. Rollers 13 are provided adjacent to the receipt potion of the card carrier guide 28. The pretreatment card storage section 12 and the post-treatment card storage section 17 are fixedly mounted and rest on a stage 33 illustrated, for example, in FIG. 8 which is moved in the direction arrowed in FIG. 9. The stage 33 is moved, and the card prior to data writing is pushed out of the pretreatment card storage section 12 so that the card after writing is received in the post-treatment card storage section 17.

In connection with the above, a carrier mechanism may be similar in arrangement to that illustrated in FIG. 2. In this case, the stage 33 can be dispensed with. Other functional advantages are similar to those of the second embodiment, and the description thereof will be omitted.

It is apparent in this invention that embodiments different in broad scope from each other can be arranged on the basis of the spirit of the invention. The invention should not be limited by its specific embodiments except for being limited by appended claims.

What is claimed is:

1. An automatic card issuance apparatus comprising:
   means for reading information which is recorded onto an information playback section of a card which has the information playback section having information which includes said information serving as a key and which is recorded by an information recording means, and an information recording and playback section;

means, operably coupled to said reading means, for writing information onto the information recording and playback section of said card;

control means, operably coupled to said writing means, for executing such control as to automatically retrieve information to be recorded onto said information recording and playback section from data storing means arranged at one of the outside and the inside of said apparatus on the basis of the information recorded onto said information playback section and read by said reading means, and to record information taken out of said retrieval, onto the information recording and playback section of said card by said writing means, wherein said reading means reads said information recorded by said information recording means on said information playback section of said card, said information serving as said key for retrieving information stored in said data storage means.

card receipt means enabling at least one of taking-out and receipt of a plurality of cards; and card moving means for moving said cards so as to take out the cards from said card receipt means or so as to receive the cards into said card receipt means, and for controlling said movement by said control means, wherein said card moving means includes carrier means controlled by said control means for carrying said card among said reading means, said writing means and said card receipt means.

2. An automatic card issuance apparatus comprising:

means for reading information which is recorded onto an information playback section of a card which has the information playback section having information which includes said information serving as a key and which is recorded by an information recording means, and an information recording and playback section;

means, operably coupled to said reading means, for writing information onto the information recording and playback section of said card;

control means, operably coupled to said writing means, for executing such control as to automatically retrieve information to be recorded onto said information recording and playback section from data storing means arranged at one of the outside and the inside of said apparatus on the basis of the information recorded onto said information playback section and read by said reading means, and to record information taken out of said retrieval, onto the information recording and playback section of said card by said writing means, wherein said reading means reads said information recorded by said information recording means on said information playback section of said card, said information serving as said key for retrieving information stored in said data storage means.

card receipt means enabling at least one of taking-out and receipt of a plurality of cards; and card moving means for moving said cards so as to take out the cards from said card receipt means or so as to receive the cards into said card receipt means, and for controlling said movement by said control means, wherein said card moving means includes drive means for moving said card receipt means and for being controlled by said control means, in order for said card to be taken out of said card receipt means or in order to receive said card into said card receipt means.

3. An automatic card issuance apparatus comprising:

means for reading information which is recorded onto an information playback section of a card which has the information playback section having information which includes said information serving as a key and which is recorded by an information recording means, and an information recording and playback section;

means, operably coupled to said reading means, for writing information onto the information recording and playback section of said card;

control means, operably coupled to said writing means, for executing such control as to automatically retrieve information to be recorded onto said information recording and playback section from data storing means arranged at one of the outside and the inside of said apparatus on the basis of the information recorded onto said information playback section and read by said reading means, and to record information taken out of said retrieval, onto the information recording and playback section of said card by said writing means, wherein said reading means reads said information recorded by said information recording means on said information playback section of said card, said information serving as said key for retrieving information stored in said data storage means.

card receipt means enabling at least one of taking-out and receipt of a plurality of cards; and card moving means for moving said cards so as to take out the cards from said card receipt means or so as to receive the cards into said card receipt means, and for controlling said movement by said control means, wherein said receipt means includes:

un-treated card receipt means for receiving a card before said information is read by said reading means and before said retrieved information is written by said writing means, and issuance-treated card receipt means for receiving a card on which said retrieved information is written by said writing means, wherein carrier means controlled by said control means for carrying said card is interposed between said untreated card receipt means and said issuance treated card receipt means, and said reading means and said writing means, and wherein said control means controls said carrier means so that said reading means, said carrier means and said untreated card receipt means are opposed against each other, upon said reading, while said control means drivingly controls said carrier means so that said writing means, said carrier means and said issuance treated card receipt means are opposed against each other, at said writing.

4. An automatic card issuance apparatus comprising:

means for reading information which is recorded onto an information playback section of a card which has the information playback section having information which includes said information serving as a key and which is recorded by an information recording means, said card further having an information recording and playback section;

means, operably coupled to said reading means, for writing information onto the information recording and playback section of said card based on said information recorded onto said information playback section serving as the key for retrieving information stored in a data storage means;

control means, operably coupled to said writing means, for executing such control as to automatically retrieve information to be recorded onto said information recording and playback section from data storing means arranged at one of the outside and the inside of said apparatus on the basis of the information recorded onto said information playback section serving as the key and read by said reading means, and to record information taken out of said retrieval, onto the information recording and playback section of said card by said writing means, wherein said reading means reads said information recorded by said information recording means on said information playback section of said card, said information serving as said key for retrieving information stored in said data storage means;

card receipt means enabling at least one of taking-out and receipt of a plurality of cards; and card moving means for moving said cards so as to take out the cards from said card receipt means or so as to receive the cards into said card receipt means, and for controlling said movement by said control means, wherein said card moving means includes carrier means controlled by said control means for carrying said card among said reading means, said writing means and said card receipt means.

5. An automatic card issuance apparatus comprising:

means for reading information which is recorded onto an information playback section of a card which has the information playback section having information which includes said information serving as a key and which is recorded by an information recording means, said card further having an information recording and playback section;

means, operably coupled to said reading means, for writing information onto the information recording and playback section of said card based on said information recorded onto said information playback section serving as the key for retrieving information stored in a data storage means;

control means, operably coupled to said writing means, for executing such control as to automatically retrieve information to be recorded onto said information recording and playback section from data storing means arranged at one of the outside and the inside of said apparatus on the basis of the information recorded onto said information playback section serving as the key and read by said reading means, and to record information taken out of said retrieval, onto the information recording and playback section of said card by said writing means, wherein said reading means reads said information recorded by said information recording means on said information playback section of said card, said information serving as said key for retrieving information stored in said data storage means;

card receipt means enabling at least one of taking-out and receipt of a plurality of cards; and card moving means for moving said cards so as to take out the cards from said card receipt means or so as to receive the cards into said card receipt means, and for controlling said movement by said control means, wherein said card moving means includes drive means for moving said card receipt means and for being controlled by said control means, in order for said card to be taken out of said card receipt means or in order to receive said card into said card receipt means.

6. A automatic card issuance apparatus comprising:

means for reading information which is recorded onto an information playback section of a card which has the information playback section having information which includes said information serving as a key and which is recorded by an information recording means, said card further having an information recording and playback section;

means, operably coupled to said reading means, for writing information onto the information recording and playback section of said card based on said information recorded onto said information playback section serving as the key for retrieving information stored in a data storage means;

control means, operably coupled to said writing means, for executing such control as to automatically retrieve information to be recorded onto said information recording and playback section from data storing means arranged at one of the outside and the inside of said apparatus on the basis of the information recorded onto said information playback section serving as the key and read by said reading means, and to record information taken out of said retrieval, onto the information recording and playback section of said card by said writing means, wherein said reading means reads said information recorded by said information recording means on said information playback section of said card, said information serving as said key for retrieving information stored in said data storage means;

card receipt means enabling at least one of taking-out and receipt of a plurality of cards; and card moving means for moving said cards so as to take out the cards from said card receipt means or so as to receive the cards into said card receipt means, and for controlling said movement by said control means, wherein said receipt means includes un-treated card receipt means for receiving a card before said information is read by said reading means and before said retrieved information is written by said writing means, and issuance-treated card receipt means for receiving a card on which said retrieved information is written by said writing means, wherein carrier means controlled by said control means for carrying said card is interposed between said untreated card receipt means and said issuance treated card receipt means, and said reading means and said writing means, and wherein said control means controls said carrier means so that said reading means, said carrier means and said untreated card receipt means are opposed against each other, upon said reading, while said control means drivingly controls said carrier means so that said writing means, said carrier means and said issuance treated card receipt means are opposed against each other, at said writing.

* * * * *